(12) United States Patent
Jayapalan et al.

(10) Patent No.: US 10,601,993 B2
(45) Date of Patent: Mar. 24, 2020

(54) MEDIA FORKED APPLICATION SYSTEM IN CALL CENTERS

(71) Applicant: United Services Automobile Association (USAA), San Antonio, TX (US)

(72) Inventors: Vijay Jayapalan, San Antonio, TX (US); Greg Yarbrough, San Antonio, TX (US); Eric J. Smith, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/403,808

(22) Filed: May 6, 2019

(65) Prior Publication Data
US 2019/0260873 A1    Aug. 22, 2019

Related U.S. Application Data

(63) Continuation of application No. 14/526,749, filed on Oct. 29, 2014, now Pat. No. 10,334,099.

(51) Int. Cl.
| | |
|---|---|
| *H04M 3/51* | (2006.01) |
| *H04M 3/22* | (2006.01) |
| *H04L 29/06* | (2006.01) |
| *H04N 21/439* | (2011.01) |
| *G06Q 30/02* | (2012.01) |

(52) U.S. Cl.
CPC .......... *H04M 3/5175* (2013.01); *G06Q 30/02* (2013.01); *H04L 63/1408* (2013.01); *H04L 65/1083* (2013.01); *H04L 65/80* (2013.01); *H04M 3/2281* (2013.01); *H04M 3/51* (2013.01); *H04M 3/5133* (2013.01); *H04N 21/4394* (2013.01); *H04M 2203/401* (2013.01)

(58) Field of Classification Search
None
See application file for complete search history.

(56) References Cited

U.S. PATENT DOCUMENTS

| | | | |
|---|---|---|---|
| 8,535,059 B1 | 9/2013 | Noble | |
| 8,537,983 B1 * | 9/2013 | Haggerty | H04M 11/00 379/88.14 |
| 8,693,644 B1 * | 4/2014 | Hodges, Jr. | H04M 3/5175 379/265.06 |
| 9,456,083 B1 * | 9/2016 | Ouimette | H04M 3/5175 |
| 10,334,099 B2 * | 6/2019 | Jayapalan | H04M 3/2281 |

(Continued)

OTHER PUBLICATIONS

International Preliminary Report on Patentability and Written Opinion in International Application No. PCT/US2015/057797, dated May 2, 2017, 6 pages.

(Continued)

*Primary Examiner* — Antim G Shah
(74) *Attorney, Agent, or Firm* — Fish & Richardson P.C.

(57) ABSTRACT

Methods, systems, and apparatus, including computer programs encoded on a computer storage medium, for sending a forked media stream of an electronic communication between a customer and an agent to an analysis system for a duration. Receiving analysis results obtained from one or more analytics performed on the forked media stream. Then, determining whether to perform one or more operations in response to the analysis results.

18 Claims, 6 Drawing Sheets

(56) References Cited

U.S. PATENT DOCUMENTS

| | | |
|---|---|---|
| 2004/0062363 A1 | 4/2004 | Shambaugh et al. |
| 2005/0185779 A1 | 8/2005 | Toms |
| 2006/0023863 A1 | 2/2006 | Joseph et al. |
| 2006/0265090 A1* | 11/2006 | Conway ............ H04M 3/42221 700/94 |
| 2008/0290987 A1 | 11/2008 | Li |
| 2009/0055548 A1* | 2/2009 | Williams .......... H04M 3/42221 709/231 |
| 2010/0158237 A1 | 6/2010 | McCormack |
| 2011/0116492 A1 | 5/2011 | Byron et al. |
| 2014/0140496 A1 | 5/2014 | Ripa et al. |
| 2016/0127536 A1 | 5/2016 | Jayapalan et al. |

OTHER PUBLICATIONS

San Millán Maeso, International Search Report and Written Opinion of the International Searching Authority, International application No. PCT/US2015/057797, dated Jan. 5, 2016, 10 pages.

EP Office Action in EP Appln. No. 15 794 408.3-1218, dated Jun. 13, 2019, 5 pages.

\* cited by examiner

MEDIA FORKED APPLICATION SYSTEM IN CALL CENTERS

CROSS-REFERENCE TO RELATED APPLICATION

This application is a continuation application of and claims priority to U.S. application Ser. No. 14/526,749, filed on Oct. 29, 2014, the entire contents of which is hereby incorporated by reference.

BACKGROUND

Call centers are used to provide, among other services, customer support, technical support, and product/service ordering services to callers. A call center may receive on the order of hundreds of millions of calls per year and employ thousands of customer service representatives (CSR). To provide quality services to callers, a call center must be capable of protecting the personal information of its customers and providing proper training to its CSRs.

SUMMARY

This specification relates to analytical analyses performed on forked media streams of call center calls.

Implementations of the present disclosure generally determine one or more call center operations to be performed based on analytical analysis of forked media streams from a call to a call center. More particularly, implementations of the present disclosure are directed to receiving results of one or more analytical analyses performed on a forked media stream, and directing further operations of call center systems in response to the results. In some implementations, the analysis results include one or more metrics indicating the likelihood that a call center call is fraudulent, and based on the metrics, the call center systems can continue forking the media stream from the call for further analysis, and process the call as a fraudulent or non-fraudulent call, as applicable. In some implementations, the analysis results indicate that a context of the call is valuable for agent (e.g., CSR) training, and the call can be recorded and stored with agent training records.

In general, innovative aspects of the subject matter described in this specification can be embodied in methods that include actions of sending a forked media stream of an electronic communication between a customer and an agent to an analysis system for a duration, receiving analysis results obtained from one or more analytics performed on the forked media stream, and determining whether to perform one or more operations in response to the analysis results. Other implementations of this aspect include corresponding systems, apparatus, and computer programs, configured to perform the actions of the methods, encoded on computer storage devices.

These and other implementations can each optionally include one or more of the following features. The operations may include selectively extending the duration for sending the forked media stream. The analysis system may be a fraud detection system, and the analysis results may include voice analytic results. The operations may include extending the duration based on one or more metrics included in the analysis results. Metrics may include a fraud risk level score. The duration may be extended in response to the fraud risk level score exceeding a threshold.

The operations may include storing the forked media stream in association with training records. Analytics may include identifying the absence or presence of one or more keywords spoken by the agent. The operations may include sending a notification for display on a computing device assigned to the agent. The analysis results may identify a topic discussed during the electronic communication, and the operations may include generating a notification including one or more training reminders relevant to the topic for display on a computing device assigned to the agent.

Particular implementations of the subject matter described in this specification can be implemented so as to realize one or more of the following advantages. Implementations may make more efficient use of call center bandwidth and resources, provide improved security for call center customers, help CSRs (e.g., customer service representatives (CSR)) improve their communication skills, and save valuable training time for call centers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally determine one or more call center operations to be performed based on analytical analysis of forked media streams from a call to a call center. More particularly, implementations of the present disclosure are directed to receiving results of one or more analytical analyses performed on a forked media stream, and directing further operations of call center systems in response to the results. In some implementations, the analysis results include one or more metrics indicating the likelihood that a call center call is fraudulent, and based on the metrics, the call center systems can continue forking the media stream from the call for further analysis, and process the call as a fraudulent or non-fraudulent call, as applicable. In some implementations, the analysis results indicate that a context of the call is valuable for agent (e.g., CSR) training, and the call can be recorded and stored with agent training records.

Implementations of the present disclosure will be discussed in further detail with reference to an example context. The example context includes a financial services call center. It is appreciated, however, that implementations of the present disclosure can be realized in other appropriate contexts, for example, technical support call centers, customer service call centers, telemarketing call centers, and conference calling services. In addition, implementations of the present disclosure will be discussed in reference to "calls" (e.g., telephone calls) made to and from a call center.

Although discussed in reference to the common telephone "call;" the implementations described may be performed on any appropriate real-time duplex communication media which may be used to contact an CSR at a call center. For example, the implementations described may be performed on any electronic communications between a CSR and a caller including, but not limited to, telephone, video telephone, chat (e.g., IM, Jabber), video chat (e.g., Skype, Facetime), internet based meetings (e.g., WebEx), and conference call systems.

Furthermore, the terms "media forking," "forking," "forked copy of a call" refer to a process or a media stream produced by the process of replicating and transmitting a real-time copy of (one or both sides of) a duplex point-to-point media stream (e.g., a telephone call) to a third-party (e.g., a communication device this not included in the point-to-point connection, such as a third-party server). In some implementations, media forking may be applied to multicast communications (e.g., conference calls) where media streams from one or more of the participants in a multicast communication may be replicated and transmitted to a third party (e.g., a third party server).

Figure 1:
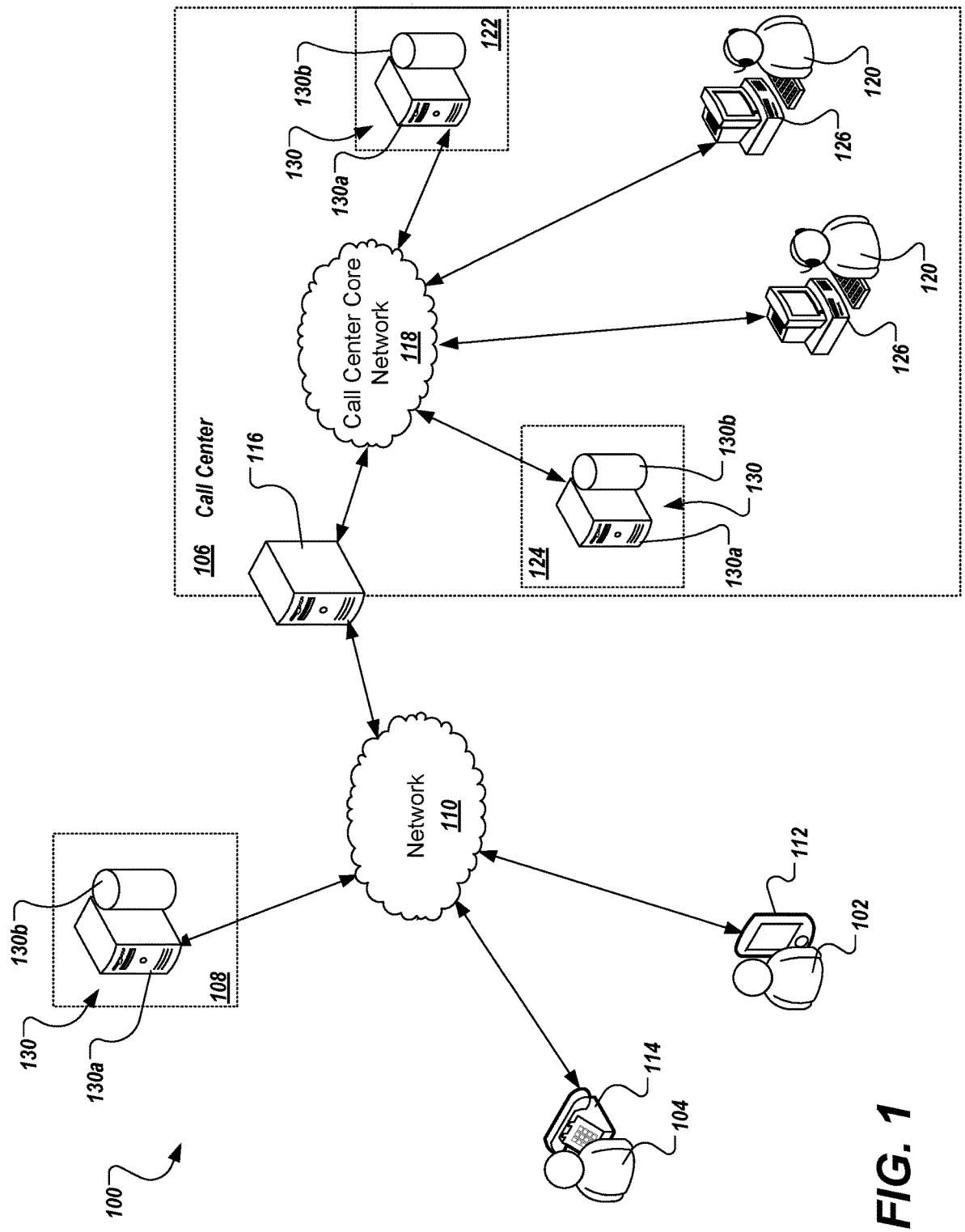
FIG. 1 depicts an example system in accordance with implementations of the present disclosure.

FIG. 1 depicts an example system 100 that can execute implementations of the present disclosure. The example system 100 is illustrated in a call center environment, including callers 102, 104, a call center 106, and one or more external systems 108. The call center 106 may be either an inbound, outbound, or blended call center, for example, a customer service center, a product or service order center, a technical support center, a telephone answering service, or a telemarketing center. Callers 102, 104 may be, for example, customers or potential customers seeking to purchase or support for various products or services. Callers 102, 104 also may be potential prospects whom an organization (e.g., business, non-profit organization, or political organization) would like to contact.

Callers 102,104 communicate with call center 106 via communication devices 112, 114 over network 110. In some examples, communication devices 112, 114 can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network 110 can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers. In some examples, the network 110 can be referred to as an upper-level network.

Call center 106 may include, for example, one or more network edge devices 116, a call center network 118, an automated menu system 122, an agent training system 124, agents 120 (e.g., CSRs), and agent workstations 126. In some examples, network edge device 116 is a network device used to provide an entry point into a call center's 106 internal network (e.g., call center network 118) including, but not limited to, a server, a router, a switch, a gateway, or other appropriate network device or combination of network devices. In some examples, automated menu system 122 can include a touch-tone system, an interactive voice response system (IVR), or any other appropriate caller menu system or combination of automated caller menu systems.

Agents 120 may make and receive customer calls at workstations 126. In some examples, a workstation 126 can include one or more computing devices and one or more communication devices (e.g., similar to communication devices 112 and/or 114 described above). Computing devices can be any type of computing device with which an agent 120 can access information related to customer calls (e.g., customer account information, marketing information, call lists, technical support information, product information and/or service information). Computing devices may include, but are not limited to, one or more desktop computers, laptop computers, notebook computers, tablet computers, and other appropriate devices.

In some implementations, Agents 120 and workstations 126 may not be physically located at the call center 106, but may be geographically remote from the call center 106. For example, Agents 120 may work from a home office and access call center network 118 over network 110 and via a virtual private network (VPN).

In some examples, external systems 108 are third-party operated systems to which one or more call center processing or data analysis operations can be outsourced by the call center 106. External system 108 may, for example, perform operations such as fraud analysis, speech injection services, voice-to-text services, and real-time call analytics.

External system 108, automated menu system 122, and agent training system 124 include computing systems 130. The computing systems 130 can each include a computing device 130a and computer-readable memory provided as a persistent storage device 130b, and can represent various forms of server systems including, but not limited to a web server, an application server, a proxy server, a network server, or a server farm.

Figure 2A:
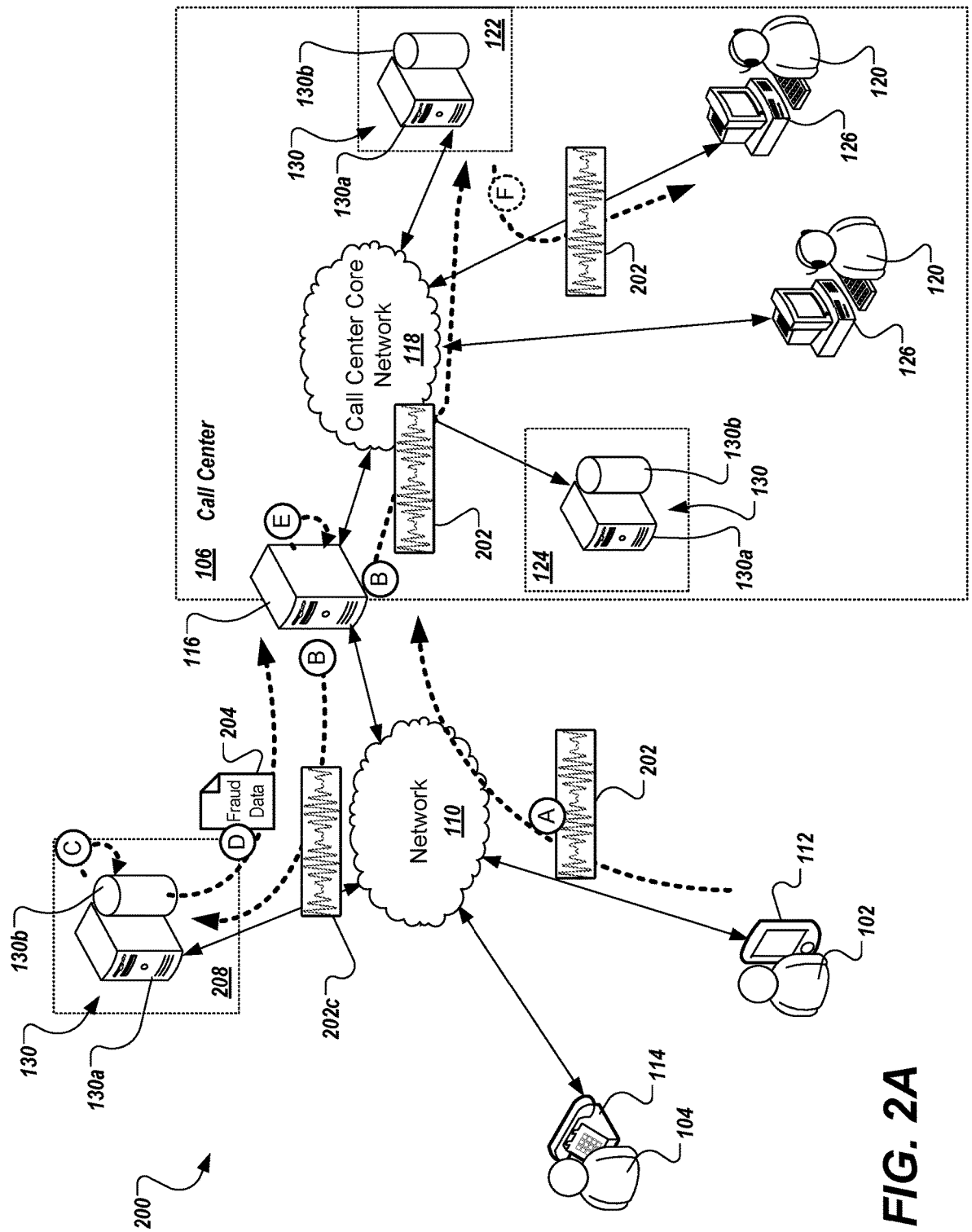
FIGS. 2A and 2B depict an example fraud detection process flow within the example system.
Figure 2B:
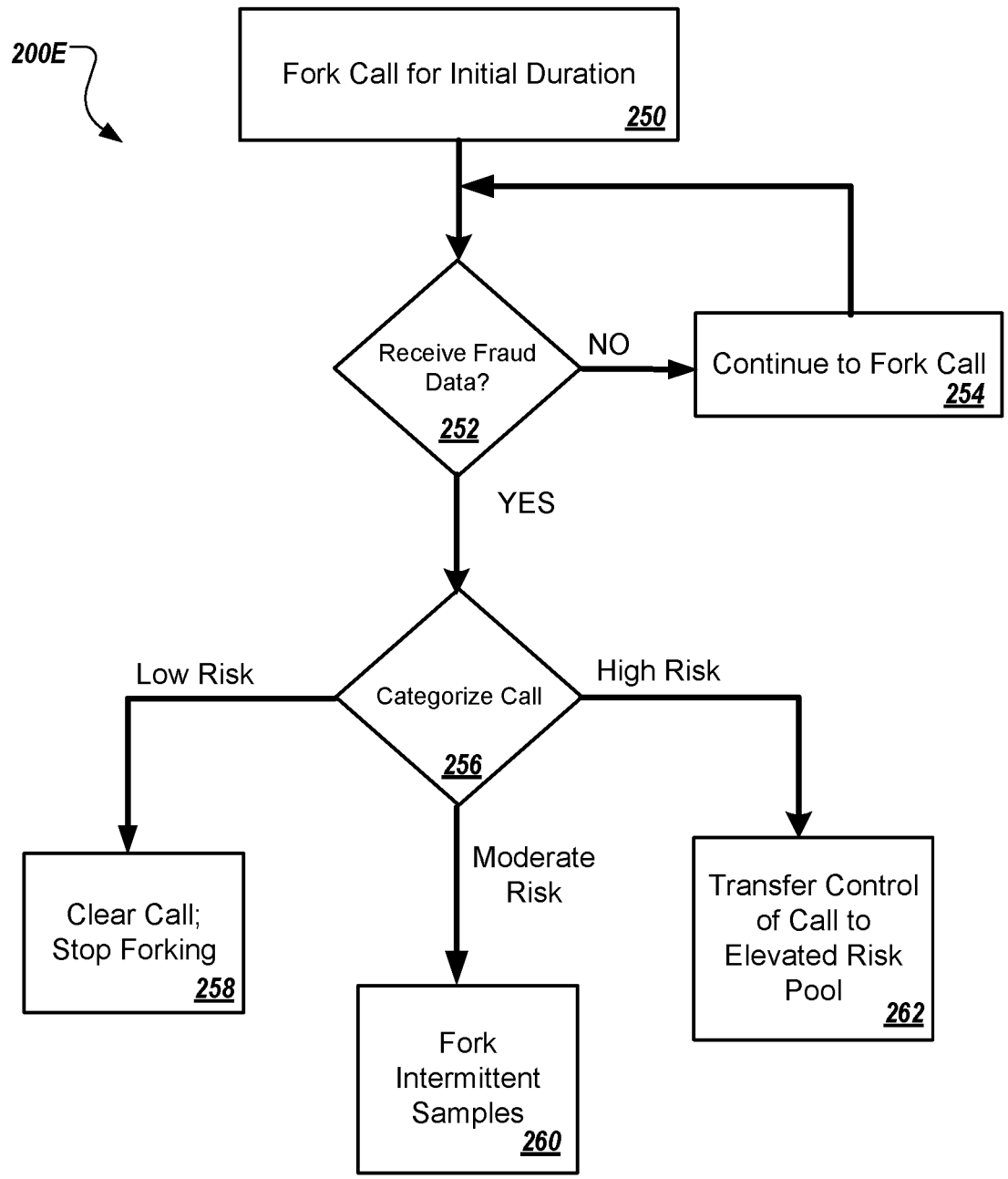

FIGS. 2A and 2B depict an example process flow for a fraud detection process 200 within the example system 100. The process 200 illustrated in FIG. 2A depicts an example process 200 performed by system 100. In this example, a call center's 106 network edge device 116 receives a customer call 202, passes the call 202 to the call center network 118, and forks a copy 202c of the call 202 to an external fraud detection system 208. The copy 202c of the call 202 may be processed by fraud detection system 208 to determine a fraud risk level of the call 202. The call 202 may be processed concurrently by the computing systems 130 within the call center network 118 according to a standard process or processing of the call 202 may be altered based on fraud analysis results obtained from the fraud detection system 208.

In more detail, during state (A), call center 106 receives a call 202 from caller 102 at network edge device 116. For example, call center 106 may be a call center associated with a fictional bank ("First Bank") and caller 102 ("Vijay") may be a fictional First Bank customer. Further, Vijay (caller 102) may contact First Bank's call center 106 using communication device 112 via telephone, chat, video chat, or any appropriate means of communication. In a parallel example, caller 102 may not be a customer of First Bank, but instead, may be an impostor attempting to gain access to Vijay's customer account information.

During state (B), network edge device 116 passes the call 202 to an appropriate system within the call center 106 for processing, and forks a copy of the call 202c to one or more external systems such as, fraud detection system 208. For example, network edge device 116 may pass the call 202 to automated menu system 122, which may, for example, request customer information (e.g., a First Bank member number) from Vijay (caller 102) and provide Vijay (caller 102) with a list of automated and agent services (e.g., checking account balances, transferring funds, opening a new account, etc.). Based on a Vijay's (caller 102) responses to the automated menu system 122, the call 202 may be placed in an electronic queue to speak with an agent 120, and ultimately, transferred to an agent's 120 workstation 126 during optional state (F).

In addition, network edge device 116 forks a copy 202c of the call 202 to the fraud detection system 208 by, for example, replicating the media stream of the call 202 into a second real-time copy 202c and sending the copy 202c to the fraud detection system 208. Generally, network edge device 116 forks only the media stream associated with the caller's 102 side of the call 202, for example, using speaker separation, however, network edge device 116 may send both sides of the call (e.g., in a unicast call), or even may send multiple media streams representing three or more speakers (e.g., in a multicast conference call). In an implementation where network edge device 116 forks more than one speaker's media stream, media streams representing each party of a call may be separated to permit fraud detection system 208 to properly analyze each speaker individually, for example.

Fraud detection system 208 may be a voice analytics system, which during state (C), performs voice analytics on the copy 202c of call 202 and generates fraud data 204 associated with the call. The fraud data 204 may include a fraud risk level indicating the likelihood that the caller 102 is a potential fraudulent caller. For example, a call from Vijay may result in a relatively low fraud risk level, whereas a call from a previously identified imposter may result in a relatively high fraud risk level. In addition, fraud data 204 also may include confidence score data with the fraud risk level, analysis status data (e.g., percent completion, time remaining), and administrative data (e.g., requests for additional voice data i.e., continued call forking). Fraud detection system 208 then sends the resulting fraud detection data 204 to network edge device 116 (state (D)).

During state (E), network edge device 116 determines whether to perform additional operations on the call 202 based on the received fraud data 204. FIG. 2B describes state (E) in more detail. FIG. 2B depicts an example process 200E that can be executed in accordance with state (E) of process 200. In some examples, the example process 200E can be provided as one or more computer-executable programs executed using one or more computing devices, such as network edge device 116, for example. In some examples, the process 200E is executed to determine whether to perform additional operations on a call center call 202, and if so, what operations to perform on the call 202 in response to fraud data 204 received from a fraud detection system 208. Consequently, adaptively streaming a forked media stream of a call for fraud detection may save bandwidth and computing resources in a call center. In addition, streaming forked media streams of a call to external systems for analysis may further save bandwidth and computing resources in a call center.

In some examples, the forked copy 202c of call 202 is forked to the fraud detection system for an initial duration (250). For example, continuously streaming forked copies 202c of the many calls 202 received by a call center 106 may be impractical, therefore, a forked copy 202c of each call may first be sent to the fraud detection system 208 for an initial duration sufficient to obtain fraud data 204 (e.g., for several hundred milliseconds, several seconds or another appropriate duration).

In some implementations, an initial forking duration may be the same for all calls 202 received by the call center 106. In some implementations, an initial forking duration may be determined for different calls or classes of calls based on various attributes of the call 202 or attributes of calls within a class. For example, an initial forking duration may be reduced for a call 202 received from a communication device 112, 114 associated with a customer's account. For instance, if Vijay calls First Bank from a mobile phone listed in his First Bank member profile, his call may be forked for a shorter initial duration than if he had called from a phone not listed in his profile. As another example, an initial forking duration may be increased for a call if a caller submits incorrect account information in response to requests from automated menu system 122. Additional call attributes which may be used to determine an initial call forking duration may, for example, include the amount of time required for a caller to respond to automated menu system 122 prompts.

If, after the initial forking duration, fraud data has been received from the fraud detection system 208 (252), process 200E proceeds to categorize the call (256). Otherwise, process 200E may continue to send the forked copy 202c of the call 202 to the fraud detection system (254) until fraud detection data 204 is received.

The call 202 is then categorized based on the fraud data 204 received from the fraud detection system 208 (256). For example, a call 202 may be categorized as having a Low, Moderate, or High risk of being a fraudulent call. The call may, for example, be categorized based on comparing a fraud risk level included in the fraud data 204 to predefined threshold values associated with each call risk category. Once a call 202 is classified, the call 202 may be tagged with data indicating the risk category assigned to the call. Further processing by computing systems within the call center 106 may then be altered according to the assigned risk category. For example, permissions may be granted or restrictions placed on the call based on the assigned risk category as described below. In addition, a call's risk category may be displayed to agents 120 on workstations 126. Although three call categories are shown and described (e.g., Low, Moderate, and High Risk), implementations may include additional or fewer categories, and the operations performed for each category may vary.

For example, if a call 202 is categorized as Low Risk the call 202 may be cleared for further processing within the call center 106 and forking of the call 202 to the fraud detection system 208 may be stopped (258). For example, Vijay's call may be assigned a fraud risk level below the threshold value for Low Risk calls. Therefore, Vijay's call may be designated as cleared or low risk. Such a designation may permit Vijay to access additional menus within the automated menu system 122. The designation also may be displayed on a call a center agent's 120 workstation 126. In addition, calls assigned to a low risk category may be given a priority status in queues to speak with an agent 120.

If a call 202 is categorized as moderate risk intermittent samples of the call 202 may, for example, continue to be forked to the fraud detection system 208 for additional analysis. For example, a forked copy 202c may be sent to the fraud detection system 208 for 200 ms every two minutes. A sample of a moderate risk call 202 may be forked to the fraud detection system 208 at regular (e.g., every two minutes of the call), irregular (e.g., only when the caller is speaking), or random intervals, and for varying durations (e.g., several hundred milliseconds, several seconds, or another appropriate duration).

If a call 202 is categorized as high risk, control of the call 202 may be transferred to an elevated risk pool. For example, one or more computing systems (e.g., computing systems 130) may be designated to handle control for high risk calls. Calls 202 designated as high risk may be continuously monitored by systems within the call center 106 such as, for example, security systems. In addition, such calls may be continuously forked to the fraud detection systems 208 and recorded, for example, for subsequent or concurrent transmission to proper authorities. In some implementations, high risk calls 202 may be forked to a call tracing system to determine the origin of the call 202 and a location of the caller 102, both of which may then be sent to proper authorities.

In some implementations, fraud data 204 may be received during the initial forking duration (step 252), however, the forked copy 202c of the call 202 may continue to be sent to the fraud detection system 208 for further analysis based on a confidence score associated with the fraud risk level and included in the fraud data 204. For example, a confidence score included in the fraud data 204 may be below a predefined confidence score threshold value. For example, an imposter may be attempting to gain access to Vijay's account information at First Bank and the fraud detection system 208 may not yet have voice printed the imposter, and therefore, may generate a low confidence score. Alternatively or in addition, a caller 102, 104 may not have spoken or may have spoken very little during the initial forking duration such that only a limited amount of voice data has been provided to the fraud detection system in the forked copy 202c of the call 202. For instance, the caller 102, 104 may have responded to prompts from the automated menu system 122 using touch-tone inputs instead of verbal responses, and/or the caller 102, 104 may have spent much of the initial forking duration waiting in an electronic queue. In such an implementation, the network edge device 116 may continue forking the copy 202c of call 202 to the fraud detection system 208 for further analysis.

In some implementations, fraud data 204 may be received before the initial forking duration expires and the network edge device 116 may stop forking the call 202 prior to the expiration of the initial forking duration. In some implementations, the network edge device 116 may only discontinue forking the call 202 prior to the expiration of the initial forking duration if a confidence score associated with a call risk level is above predefined threshold value.

In some implementations, calls 202 may be categorized (step 256) based on the fraud risk level of the call and a fraud risk level confidence score. For example, in some implementations a weighted fraud risk level may be computed using the confidence score. The call may then be categorized based on the weighted fraud risk level.

In some implementations, the confidence score may be used to determine whether or how long to continue forking a call 202 to the fraud detection system 208 while a fraud risk level is used to determine how to categorize the call 202 for further processing within the call center 106. For example, a call having a fraud risk level below a low risk category threshold value may be identified as a low risk call and may be cleared for further processing as described above. However, if the low risk call has a low confidence score (e.g., below a confidence score threshold value) the low risk call may still be forked (either intermittently or continuously) to the fraud detection system 208. Similarly, a call 202 having a high risk level (e.g., a risk level greater than a high risk category threshold value) but a high confidence score may be identified as a high risk call and control of the call transferred to an elevated risk pool of calls, however, forking of the high risk call to the fraud detection system may be stopped because of the high confidence score.

In some implementations, call categorization (step 256) may be based on other call attributes in addition to fraud risk scores. For example, other call attributes including, but not limited to whether a caller has provided incorrect or inconsistent information, caller response time for responses to prompts for personal/account information, whether the caller is calling from a communication device associated with a customer account, a geographical origin of the call, call characteristics such as tonal qualities to validate call modality (e.g., whether a caller is calling from a mobile device), carrier details from the caller origin, and other call attributes also may be considered. In some implementations, each attribute, including the fraud risk score and associated confidence score (as appropriate), may be weighted and combined into a comprehensive fraud score. The call may then be categorized based on the comprehensive fraud score.

Figure 3:
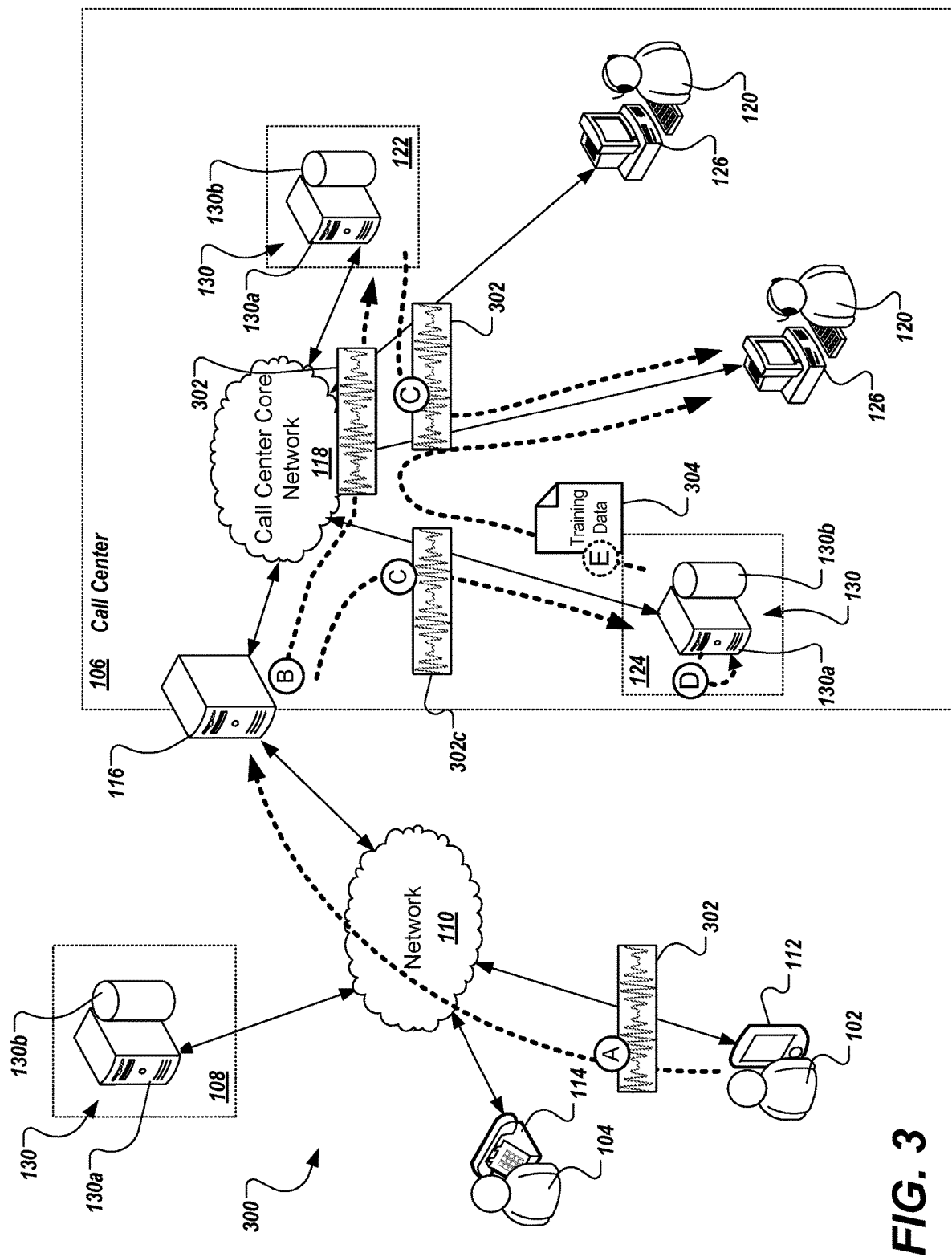
FIG. 3 depicts an example agent training process flow within the example system.

FIG. 3 depicts an example process flow for an agent training process 300 within the example system 100. The process 300 shows an example process performed by system 100. In this example, a call center's 106 network edge device 116 receives a customer call 302, passes the call 302 to the call center network 118, and forks a copy 302c of the call 302 to an agent training system 124. The copy 302c of the call 302 may be processed by the agent training system 124 to determine the training value of the call 302. While the call 302 may be processed concurrently by the computing systems 130 within the call center network 118 according to a standard process.

In more detail, during state (A), like in process 200, call center 106 receives a call 302 from caller 102 at network edge device 116. For example, call center 106 may be a call center associated with a bank ("First Bank") and caller 102 ("Vijay") may be a First Bank customer. Further, Vijay (caller 102) may contact First Bank's call center 106 using communication device 112 via telephone, chat, video chat, or any appropriate means of communication.

During state (B), network edge device 116 passes the call 302 an appropriate system within the call center 106 for processing. For example, network edge device 116 may pass the call 302 to automated menu system 122, which may, for example, request information (e.g., a First Bank member number) from caller 102 (Vijay) and provide caller 102 (Vijay) with a list of automated and agent services (e.g., checking account balances, transferring funds, opening a new account, etc.). Based on a caller's 102 responses to the automated menu system 122, the call 302 may be placed in an electronic queue to speak with an agent 120, and ultimately, transferred to an agent's workstation 126 during state (C).

In addition, during state (C), network edge device 116 forks a copy of the call 302 to the agent training system 124 by, for example, replicating the media stream of the call 302 into a second real-time copy 302c and sending the copy to the agent training system 124. Network edge device 116 may fork only the agent 120 media stream of the call 302, for example, using speaker separation, network edge device 116 may send both sides of the call (e.g., in a unicast call), or network edge device 116 may even send multiple media streams representing three or more speakers (e.g., in a multicast conference call). In an implementation where network edge device 116 forks more than one speaker's media stream, media streams representing each party of a call may be separated to permit agent training system 124 to properly analyze each speaker individually, for example.

During state (D), agent training system 124 records the copy 302c of the call 302 and analyzes the forked copy 302c for training value using, for example, analytical methods, statistical methods, rule based analysis methods, or a combination any two or all three. For example, agent training system 124 may monitor the forked copy 302c of the call 302 for the presence or absence of key words or phrases (e.g., tokens) spoken by the agent 120. For example, the presence of a restricted token may indicate that the specific agent 120 needs to be trained not to use of the restricted word or phrase. In a similar manner, the presence of the same restricted word for phrase in calls handled by multiple different agents may indicate that more comprehensive training is required on the topic. Likewise, for example, the absence of a key marketing term or phrase from a call may indicate that similar levels of training are required on the use of the marketing term or phrase.

If agent training system 124 determines that call 302 has training value, agent training system 124 will store the recording of the forked copy 302c for use in subsequent agent training. Otherwise, if agent training system 124 determines that call 302 does not have training value, agent training system 124 will not store the recording of the forked copy 302c, and may discard the recording. Accordingly, identifying and storing recordings of only calls that have training value may make more efficient use of computing and computer storage resources in a call center. It should be noted, however, that although agent training system 124 may discard the recording of the forked copy 302c, another call center system may store a separate recording of call 302 or of another forked copy of call 302 for other purposes, for instance, for security purposes.

For example, due to regulatory rules, First Bank may restrict its agents 120 from using the term "interest rate" when discussing loans, and instead, instruct the agents 120 to use "APR." In an example scenario, a fictional CSR, "Greg," states, "First Bank's Prime Choice Home Loan has an interest rate of 5.63 percent," during a call with Vijay (caller 102) about potential mortgage options. Agent training system 124 will identify the phrase "interest rate" in the forked copy 302c as a restricted phrase and store the recording of the forked copy 302c. Similarly, for example, First Bank may be launching a new loan product, the Prime Choice Home and Auto Loan Bundle, and may instruct its agents to offer each potential mortgage customer the Prime Choice Home and Auto Loan Bundle. During the same call with Vijay (caller 102), Greg may fail to offer Vijay the new loan product. In such a situation, agent training system 124, by monitoring the forked copy 302c of the call 302, may recognize that mortgages were discussed during the call, but that agent 120, Greg, did not speak one or more key words or phrases (tokens) related to the new Prime Choice Home and Auto Loan Bundle, and, in response, may store the recording of the forked copy 302c.

In some implementations, during optional state (E), agent training system 124 sends real-time training data 304 for display on an agent's 120 workstation 126 during a call 302. For example, in some implementations, agent training system 124 may implement one or more sets of training rules. The training rules may identify particular tokens, which if the tokens are detected in a forked copy 302c of a call 302, prompt agent training system 124 to send real-time training data 304 to the workstation 126 assigned to the agent 120 who is handling the call 302. Continuing the example scenario above, after the agent training system 124 detects that agent 120 Greg said "interest rate," the agent training system 124 may send a notification to be displayed on Greg's workstation 126 stating, "CAUTION: You said 'Interest Rate.' Use 'APR' instead." Such rules may be considered "reactive" rules because they instruct the agent training system 124 to provide agents 120 feedback after the agent has made an error during a call 302.

In some implementations, the training rules may include "proactive" rules, which may instruct the agent training system 124 to remind an agent 120 to either use or avoid various terms or phrases. Such "proactive" rules may be triggered based on the analytics applied to the forked copy 302c of the call 302. Such analytics may include a speech analysis to determine a general topic of the call (e.g., based on key words or phrases), automated menu options chosen by the caller 102 during state (B), and/or specific rules defined for the particular agent 120 (e.g., Greg) who is handling the call 302.

For example, the agent training system 124 may have determined, based on either keywords or automated menu options selected by Vijay (caller 102), that Vijay and Greg are discussing mortgages. In one example, a call center supervisor or a network administrator may add a training rule directing agent training system 124 to remind any agent discussing mortgages to use the term "APR" instead of "interest rate" in order to help remind the agents 120 of a new call center policy. Thus, once agent training system 124 determines that an agent 120 is discussing mortgages, agent training system 124 will send a reminder notification to be displayed on the agent's 120 workstation 126. In another example, the policy regarding usage of "APR" instead of "interest rate" may not be new, but using "interest rate" may be a common mistake that agent 120 Greg makes on calls. Therefore, Greg, Greg's supervisor, or a network administrator may add a training rule specific to Greg's calls directing agent training system 124 to send a reminder notification to Greg, if it is detected that he is discussing mortgages, to use the term "APR" instead of "interest rate." Thus, once agent training system 124 determines that agent 120 Greg is handling a call 302 and that he is discussing mortgages, agent training system 124 will send a reminder notification to be displayed on Greg's workstation 126.

In some implementations, once agent training system 124 detects the presence at least one token in a forked copy 302c of a call 302 the agent training system 124 may store the recording and stop monitoring that call 302, thereby, freeing up system resources to monitor forked copies of other calls.

In some implementations, agent training system 124 may continue monitoring the forked copy 302c of the call 302 even after having detected at least one token. In addition, recorded calls which agent training system 124 identifies as having training value (i.e., those calls in which the presence or absence of a token has been detected) may be categorized, stored, and tagged with data identifying various training attributes associated with each recorded call. For example, recorded calls may be categorized and tagged based on the training value they represent in one or more distinct training categories. Such tagging may enable more efficient sorting and searching of stored recordings for use in agent training sessions.

Figure 4:
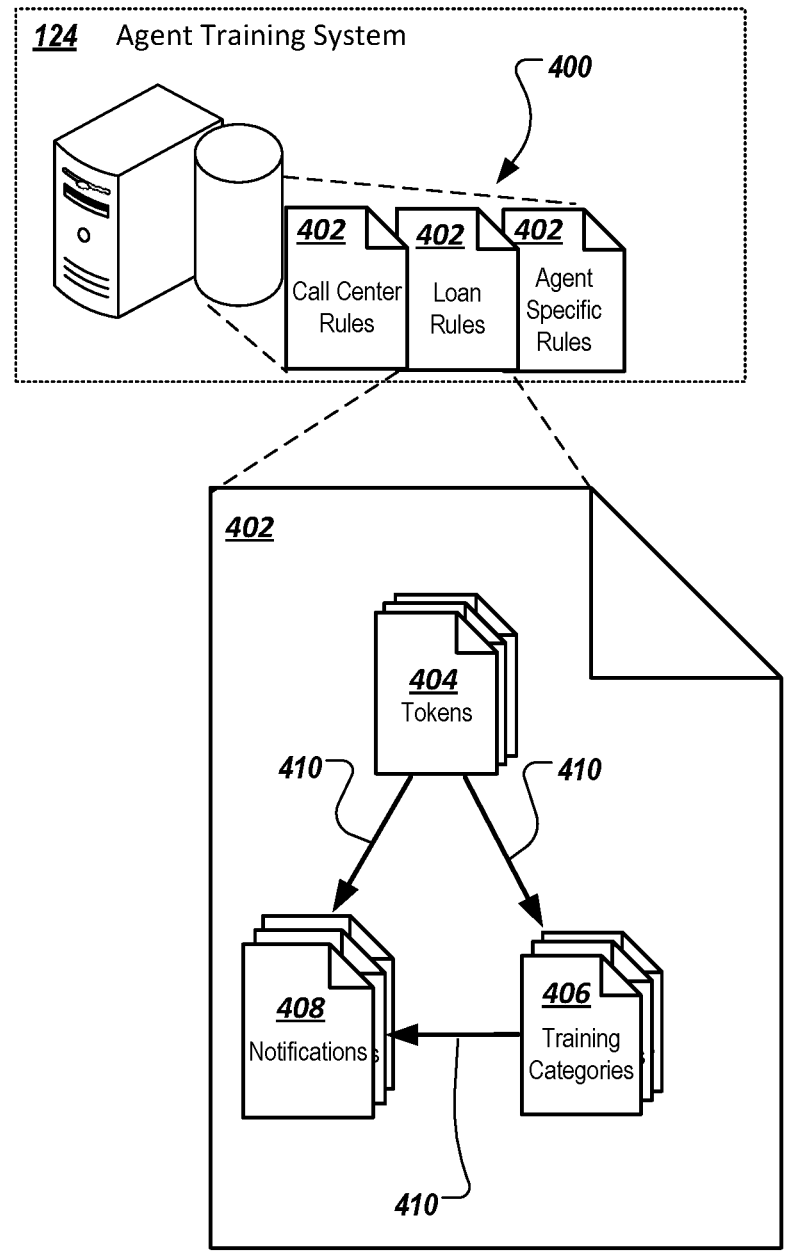
FIG. 4 depicts example call rules that may be executed by implementations of the present disclosure.

In some implementations, as mentioned above, various actions performed by agent training system 124 (e.g., sending agent notifications and categorizing stored call recordings) may be defined by one or more sets of rules. To that end, FIG. 4 depicts example call rules 400 that may be executed by agent training system 124, for example, during states (D) and (E) of process 300. In some examples, the call rules 400 can include multiple rule sets 402 defining rules specific to different groups of agents within a call center 106 or topics discussed on call center calls.

For example, rules may be defined for the call center as a whole (e.g., call center rules), rules may be defined for one or more product or service groups within the call center (e.g., loan rules, insurance rules, investment product rules), and/or rules may be defined for each agent 120 or groups of agents (e.g., new employee rules). Each set of rules 402 may define tokens 404 (e.g., as described above), training categories 406, and notifications 408 specific to the rule set. For example, a set of call center rules may define rules applicable to all or most of the agents 120 in the call center 106 including but not limited to, tokens 404, training categories 406, and notifications 408 pertaining to agent greetings, professionalism, listen vs. talk time, regulations, and overall call quality. Similarly, a set of product or service group rules may define rules applicable to agents 120 and/or calls focused on a particular product, service, or group of products and services including but not limited to, tokens 404, training categories 406, and notifications 408 pertaining to auto, home, and health insurance; banking; mortgage, auto, and personal loans; and retirement and education directed financial planning, for example. Additionally, a set of product or service group rules may define rules personalized to each agent's 120 and focused on a particular strengths and weaknesses of that agent including but not limited to, tokens 404, training categories 406, and notifications 408 pertaining to new employee, common mistake, improvements, and supervisor or agent defined rules, for example.

Furthermore, the rules may be interrelated (as indicated by arrows 408) such that the execution of one rule (e.g., detection of a token 402) may trigger another rule (e.g., assigning a recorded call to a specific training category 404 or triggering a notification 406). For example, the token "interest rate" may be defined in an example rule set. Referring to the example call between agent 120, Greg, and caller 102, Vijay, when the agent training system 124 detects the token "interest rate" in the forked copy 302*c* of the call 302, the detection of "interest rate" may trigger another associated rule. For example, a rule assigning a stored recording of the call to one or more training categories (e.g., Loan Officer Training, Common Mistakes, etc.) may be triggered. Likewise, for example, a rule defining a training notification (e.g., CAUTION: You said "Interest Rate." Use "APR" instead.") may be triggered.

In some implementations, the rule sets 402 may be user modifiable. For example, an agent 120 (or an agent's supervisor) may be able to request that a training notification reminding the agent to use the term "APR" be sent to his workstation 126 whenever the agent training system 124 detects that the agent 120 is discussing loans. However, the modifications permitted by each user may be limited by permission levels. For example, call center managers may be permitted to alter most or all of the rule sets, whereas, individual agents may only be permitted to alter portions of their own respective rule sets.

In some examples, agent training system 124 and network edge device 116 may be elements of one system within call center 106. In such an example, the operations of process 300 described above as being performed by agent training system 124 also may be performed by network edge device 116, or one or more other systems of call center 106. Similarly, the operations of process 300 described above as being performed by network edge device 116 may not be exclusive to network edge device 116 and may be performed by one or more other systems of call center 106.

Figure 5:
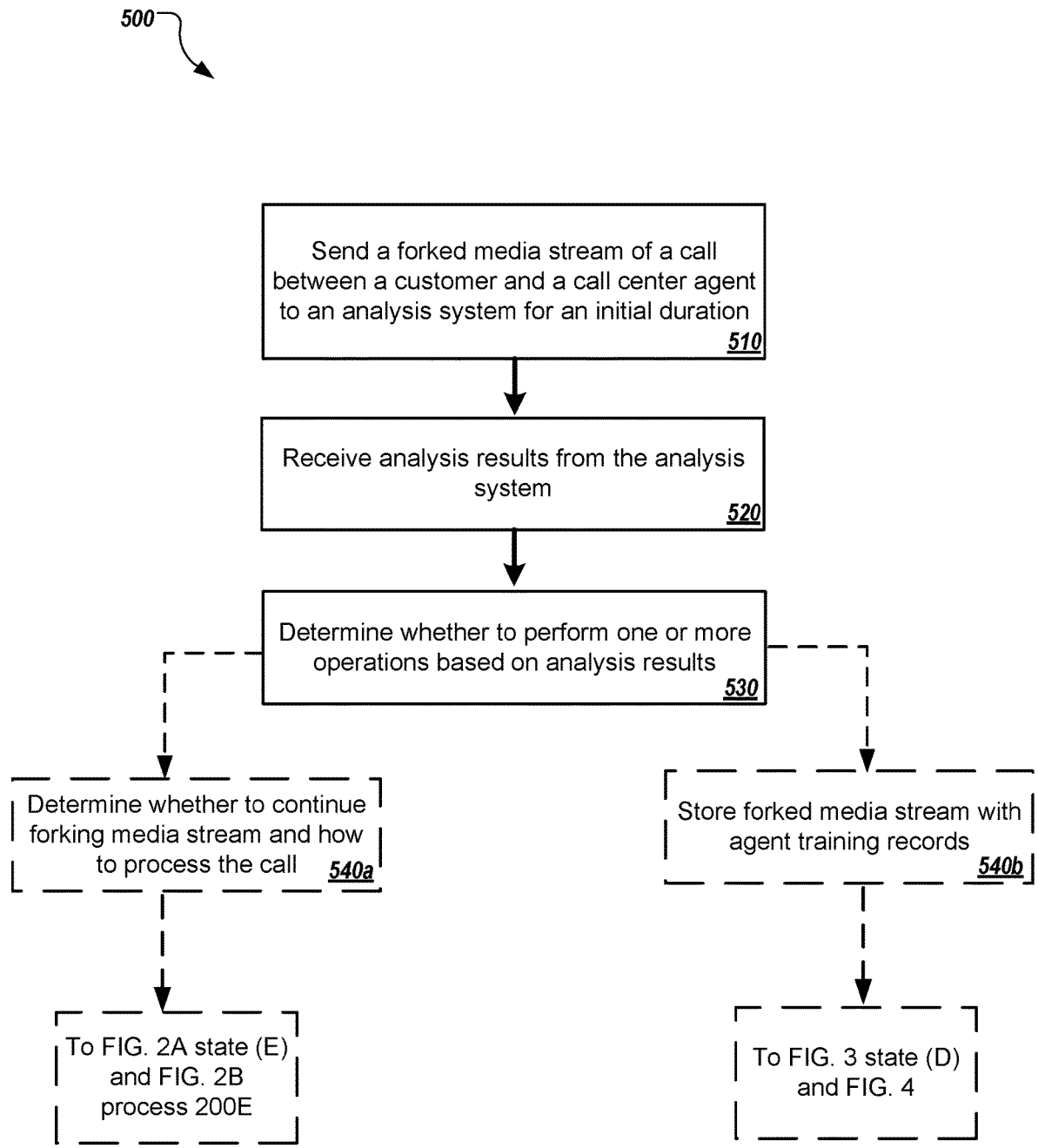
FIG. 5 depicts an example process that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices. In some examples, the process 500 is executed to detect fraudulent calls made to a call center. In some examples, the process 500 is executed to train CSRs. And in some examples, the process 500 is executed to perform multiple concurrent tasks, such as, detecting fraudulent calls made to a call center and training CSRs.

A forked media stream between a customer and a CSR is sent to an analysis system for an initial duration (510). For example, a call center computing device, such as, network edge device 116 can replicate and transmit a copy of the media stream to another system, such as a fraud analysis system 208 or an agent training system 124. Receive results of analytical analysis of forked media stream (520). For example, network edge device 116 may receive analysis results from fraud analysis system 208 and/or from agent training system 124. In some examples, the analysis results may include one or more metrics.

A determination of whether to perform one or more operations is made based on the analysis results (530). For example, network edge device 116 can determine whether to continue forking the media stream and how to further process the electronic communication (540*a*). (See above discussion in reference to FIGS. 2A and 2B.) In some examples, network edge device 116 may selectively extend the duration for sending the forked media stream. In some examples, network edge device 116 or agent training system 124 may store the forked media stream in association with training records (540*b*) (See above discussion in reference to FIGS. 3 and 4). In some examples, network edge device 116 or agent training system 124 may send a training notification for display on a computing device assigned to the agent.

In some examples, processes 200 of FIG. 2A and 300 of FIG. 3 may be performed concurrently by system 100 on the same call center call. In other words, a media stream of a given call may be forked to both an external system 108, such as fraud detection system 208, and an agent training system 124. Processes 200 and 300, described above, may then be performed using the appropriate forked copy of the same call.

In some examples, fraud analysis system 208 may perform voice analytics on the forked media stream. In some examples, the analysis results may be one or more metrics including a fraud risk level score and a confidence score. The network edge device 116 may extend the duration in response to the fraud risk level score exceeding a threshold or in response to the confidence score being below a threshold.

In some examples, the agent training system 124 identifies the absence or presence of one or more keywords or phrases (tokens) spoken by the CSR. In some examples, the network edge device 116 or the agent training system 124 may send a notification for display on a computing device assigned to the agent. In some examples, the analysis results may identify a topic discussed by the agent during the electronic communication. The network edge device 116 or the agent training system 124 may generate a notification including one or more training reminders relevant to the topic, and send the notification for display on a computing device assigned to the agent.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., such as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:
   receiving, by the at least one processor, a media stream of an electronic communication between a customer and an agent, the electronic communication comprising an agent media stream associated with speech from the agent and a customer media stream associated with speech from the customer;
   sending, by the at least one processor, a forked media stream to an analysis system during the electronic communication between the customer and the agent, the forked media stream being a separate media stream that replicates only the agent media stream from the electronic communication;
   receiving, from analysis of the forked media stream, analysis results that indicate a topic being discussed between the customer and the agent during the electronic communication, wherein the analysis results comprise a token that indicates the topic being discussed between the customer and the agent;
   identifying, from among a plurality of different rules associated with the token, a user-defined training rule that is specific to the agent, the user-defined training rule being modifiable by the agent;
   identifying, based on the analysis results of the forked media stream, content for a training notification, the content being associated with the user-defined training rule and relevant to the topic being discussed between the customer and the agent; and
   providing, during the electronic communication and for display on a computing device assigned to the agent, the training notification.

2. The method of claim 1, further comprising storing the forked media stream in association with training records.

3. The method of claim 1, wherein the token indicates one or more keywords spoken by the agent.

4. The method of claim 3, further comprising:
   identifying a second rule associated with the token; and
   in response to the second rule, storing a recording of the forked media stream in association with a training category indicated by the rule.

5. The method of any of claim 1, wherein identifying the content for the training notification comprises identifying the content for the training notification by applying a set of training rules to the analysis results.

6. The method of claim 1, wherein identifying the content for the training notification comprises identifying content for a second training notification based on a training rule that is specific to a subset of agents based on at least one common attribute shared by agents in the subset of agents.

7. A call-center agent training system comprising:
   at least one computer; and
   tangible, non-transitory media operably connectable to the at least one computer and storing instructions that, when executed, perform operations comprising:
   receiving a media stream of an electronic communication between a customer and an agent, the electronic communication comprising an agent media stream associated with speech from the agent and a customer media stream associated with speech from the customer;
   sending a forked media stream to an analysis system during the electronic communication between the customer and the agent, the forked media stream being a separate media stream that replicates only the agent media stream from the electronic communication;
   receiving, from analysis of the forked media stream, analysis results that indicate a topic being discussed between the customer and the agent during the electronic communication, wherein the analysis results comprise a token that indicates the topic being discussed between the customer and the agent;
   identifying, from among a plurality of different rules associated with the token, a user-defined training rule that is specific to the agent, the user-defined training rule being modifiable by the agent;
   identifying, based on the analysis results of the forked media stream, content for a training notification, the content being associated with the user-defined training rule and relevant to the topic being discussed between the customer and the agent; and
   providing, during the electronic communication and for display on a computing device assigned to the agent, the training notification.

8. The call-center agent training system of claim 7, further comprising storing the forked media stream in association with training records.

9. The call-center agent training system of claim 7, wherein the token indicates one or more keywords spoken by the agent.

10. The call-center agent training system of claim 9, further comprising:
identifying a second rule associated with the token; and
in response to the second rule, storing a recording of the forked media stream in association with a training category indicated by the rule.

11. The call-center agent training system of any of claim 7, wherein identifying the content for the training notification comprises identifying the content for the training notification by applying a set of training rules to the analysis results.

12. The call-center agent training system of claim 7, wherein identifying the content for the training notification comprises identifying content for a second training notification based on a training rule that is specific to a subset of agents based on at least one common attribute shared by agents in the subset of agents.

13. A non-transitory computer readable storage medium storing instructions that, when executed by at least one processor, cause the at least one processor to perform operations comprising:
receiving a media stream of an electronic communication between a customer and an agent, the electronic communication comprising an agent media stream associated with speech from the agent and a customer media stream associated with speech from the customer;
sending a forked media stream to an analysis system during the electronic communication between the customer and the agent, the forked media stream being a separate media stream that replicates only the agent media stream from the electronic communication;
receiving, from analysis of the forked media stream, analysis results that indicate a topic being discussed between the customer and the agent during the electronic communication, wherein the analysis results comprise a token that indicates the topic being discussed between the customer and the agent;
identifying, from among a plurality of different rules associated with the token, a user-defined training rule that is specific to the agent, the user-defined training rule being modifiable by the agent;
identifying, based on the analysis results of the forked media stream, content for a training notification, the content being associated with the user-defined training rule and relevant to the topic being discussed between the customer and the agent; and
providing, during the electronic communication and for display on a computing device assigned to the agent, the training notification.

14. The medium of claim 13, further comprising storing the forked media stream in association with training records.

15. The medium of claim 13, wherein the token indicates one or more keywords spoken by the agent.

16. The medium of claim 15, further comprising:
identifying a second rule associated with the token; and
in response to the second rule, storing a recording of the forked media stream in association with a training category indicated by the rule.

17. The medium of claim 13, wherein identifying the content for the training notification comprises identifying the content for the training notification by applying a set of training rules to the analysis results.

18. The medium of claim 13, wherein identifying the content for the training notification comprises identifying content for a second training notification based on a training rule that is specific to a subset of agents based on at least one common attribute shared by agents in the subset of agents.

* * * * *

UNITED STATES PATENT AND TRADEMARK OFFICE
CERTIFICATE OF CORRECTION

PATENT NO. : 10,601,993 B2  
APPLICATION NO. : 16/403808  
DATED : March 24, 2020  
INVENTOR(S) : Vijay Jayapalan, Greg Yarbrough and Eric J. Smith Page 1 of 1

It is certified that error appears in the above-identified patent and that said Letters Patent is hereby corrected as shown below:

In the Claims

Column 16, Line 23, Claim 5, before "claim" delete "any of".

Column 17, Line 10, Claim 11, before "claim" delete "any of".

Signed and Sealed this  
Twenty-second Day of December, 2020

Andrei Iancu  
*Director of the United States Patent and Trademark Office*